J. L. SCHNEIDER.
LOADING MACHINE.
APPLICATION FILED JULY 22, 1913.
1,090,418.
Patented Mar. 17, 1914.
3 SHEETS—SHEET 2.
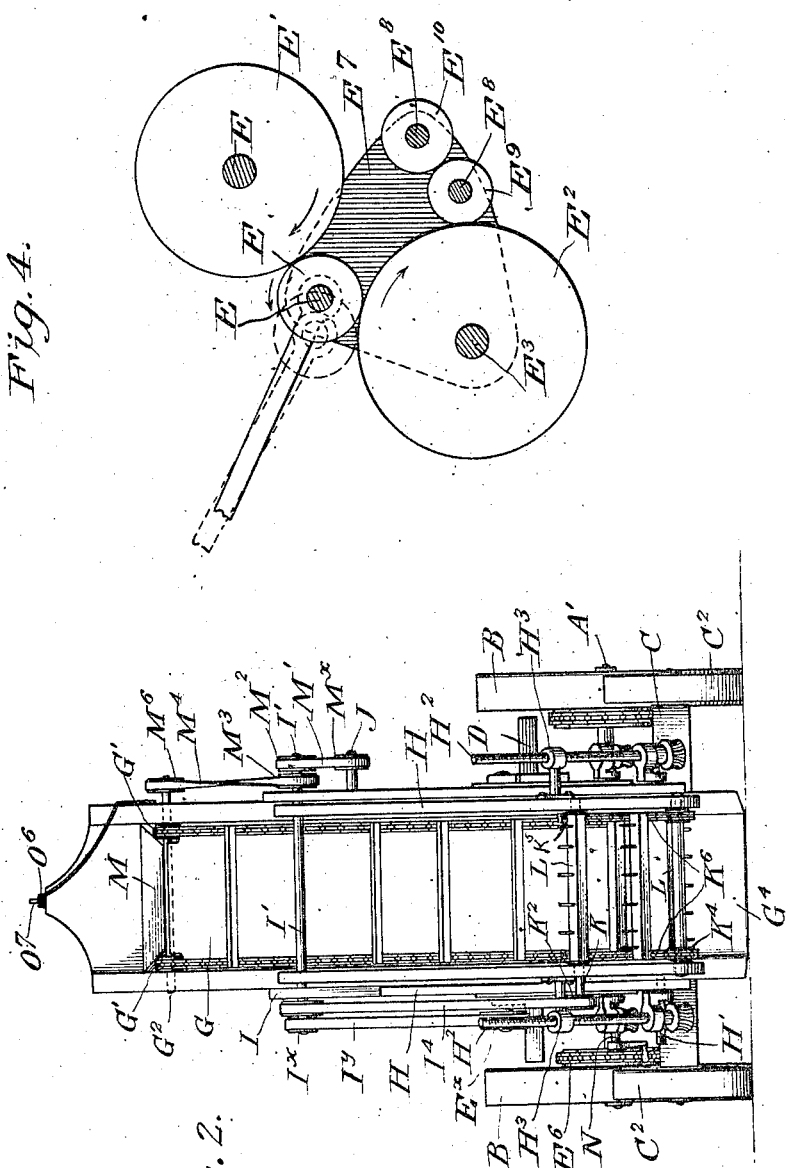

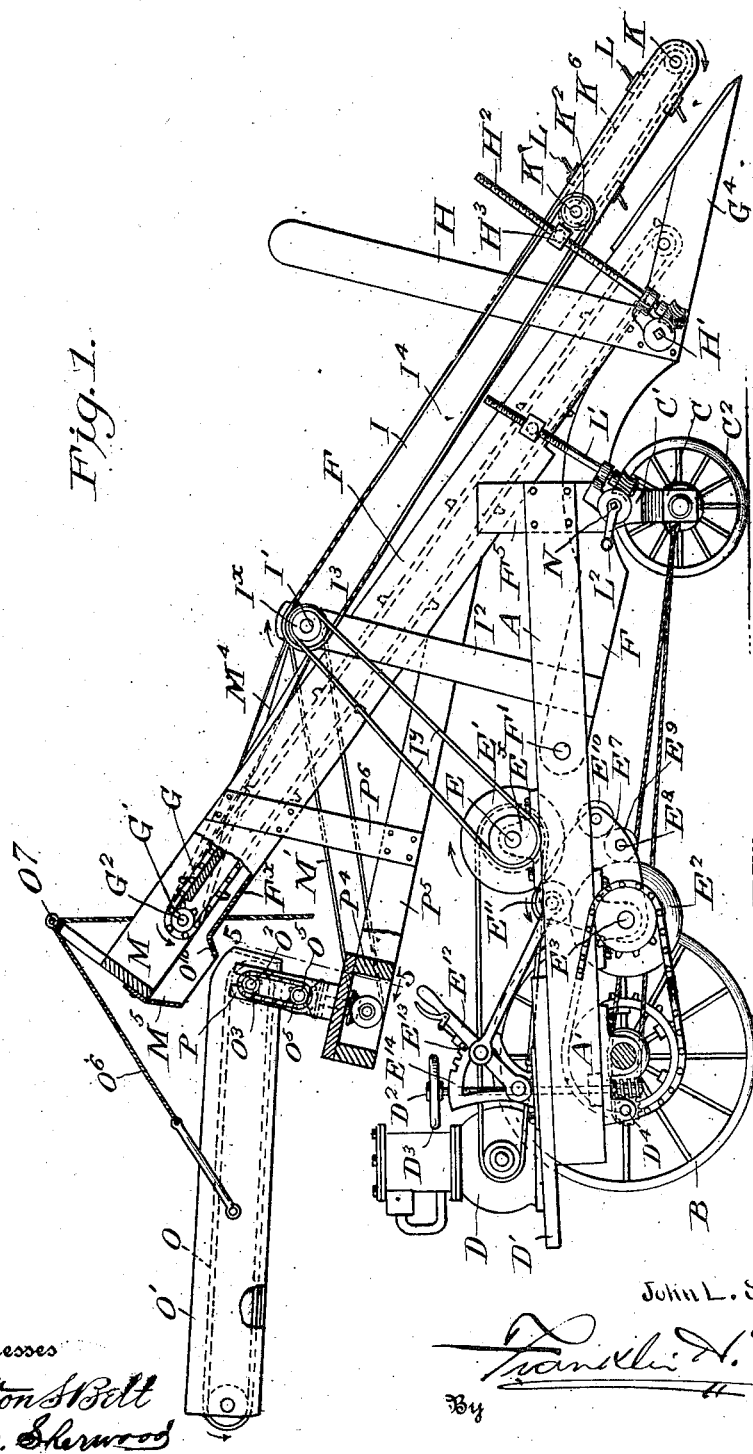

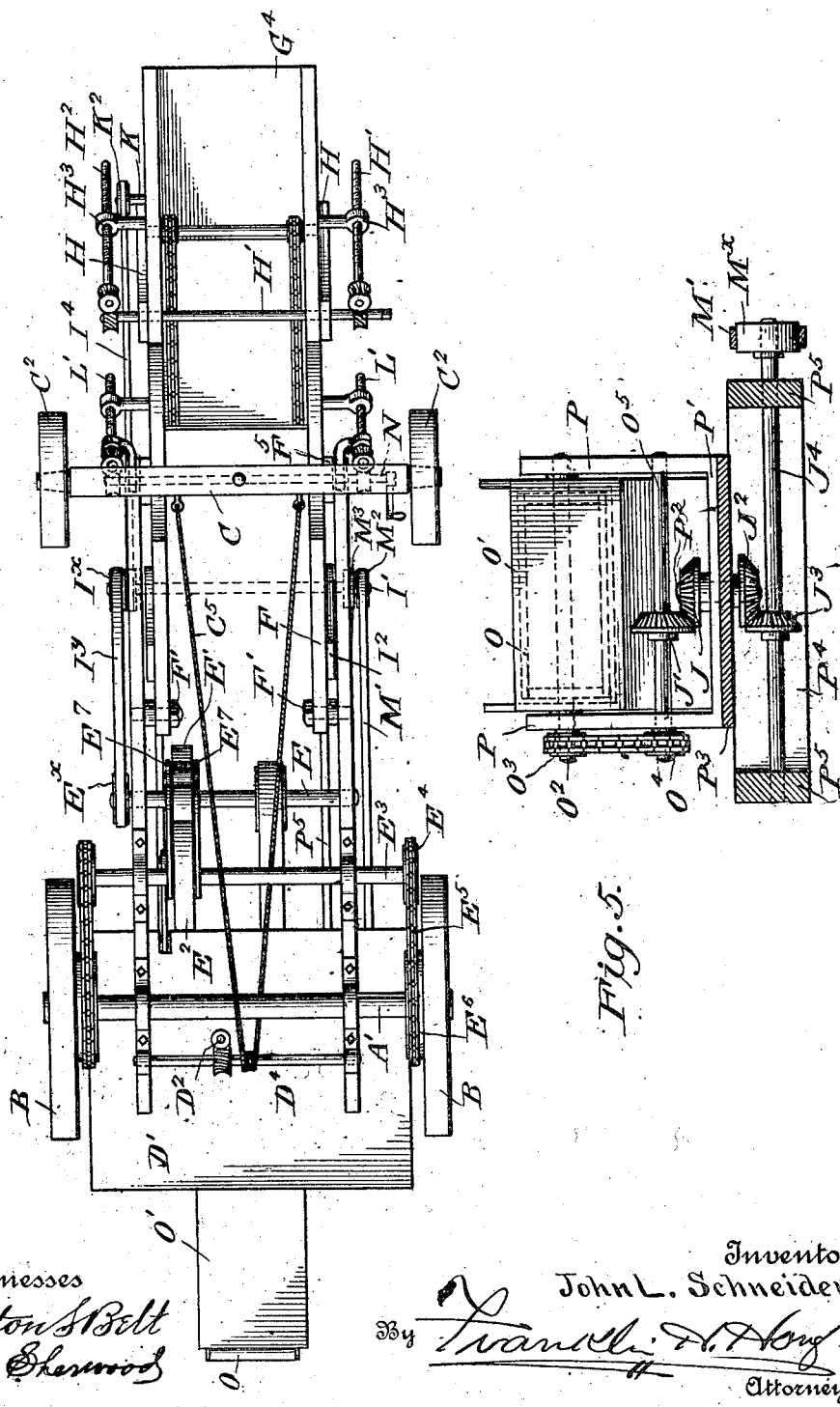

UNITED STATES PATENT OFFICE.

JOHN L. SCHNEIDER, OF CHARLES CITY, IOWA.

LOADING-MACHINE.

1,090,418.  Specification of Letters Patent.  Patented Mar. 17, 1914.

Application filed July 22, 1913. Serial No. 780,588.

*To all whom it may concern:*

Be it known that I, JOHN L. SCHNEIDER, a citizen of the United States, residing at Charles City, in the county of Floyd and State of Iowa, have invented certain new and useful Improvements in Loading-Machines; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in loading apparatus and comprises a simple and efficient device of this nature having various details of construction and combinations and arrangements of parts which will be hereinafter fully described, shown in the accompanying drawings and then specifically defined in the appended claims.

I illustrate my invention in the accompanying drawings, in which:—

Figure 1 is a side elevation of my improved loading apparatus. Fig. 2 is a front view. Fig. 3 is a bottom plan view. Fig. 4 is a sectional view through the frictional reversing mechanism, and Fig. 5 is a sectional view on line 5—5 of Fig. 1.

Reference now being had to the details of the drawings by letter, A designates the frame of the apparatus to which the rear axle A' is attached and upon which are journaled the wheels B, and C designates the forward axle which is pivotally connected to the bolster C' and has journaled thereon the wheels $C^2$. An engine D, mounted upon the platform D', is adapted to furnish power for operating the apparatus for loading as well as forming a propulsive means for driving the truck from place to place. Suitable steering apparatus consists of a vertically disposed steering shaft $D^2$ having a wheel $D^3$ at its upper end, the lower end of which is provided with a worm engaging the threads of the worm shaft $D^4$ which is journaled in suitable bracket arms in the truck frame. Chains or cables, designated by letter $C^5$, pass about said shaft $D^4$ and are connected to the forward axle, one upon either side of the pivotal center, thereby affording means whereby, as the wheel $D^3$ is turned in one direction or the other, the front axle may be turned to the right or left to steer the truck.

A counter shaft, designated by letter E, is journaled in suitable bearings upon the truck and has direct gear connection with the engine. A friction pulley E' is fixed to the shaft E and a similar friction pulley $E^2$ is fixed to a second counter shaft $E^3$ journaled in bearings in the truck and which shaft $E^3$ has a sprocket $E^4$ fixed thereto, which has chain connection $E^5$ with a sprocket $E^6$ fixed to the shaft A'. Plates $E^7$ are pivotally mounted upon the shaft $E^3$ and spaced apart and have stub shafts $E^8$ intermediate the same upon which the two friction pulleys $E^9$, $E^{10}$ and $E^{11}$ are journaled, the latter of which is adapted to be thrown frictionally in contact with the two wheels E' and $E^2$ by the swinging of said plates when it is desired to cause the truck to be driven forward and, when the plates are swung in the opposite direction in order to bring the friction pulleys $E^9$ and $E^{10}$ in contact with the two friction wheels E' and $E^2$, the truck may be driven backward. A lever $E^{12}$ is mounted upon the platform and has pivotal link connection between the same and said plates whereby, as the lever is swung back or forth, the friction apparatus may be adjusted to drive the truck forward or backward. A pawl $E^{13}$ is mounted upon said lever and adapted to engage the notches of the segment member $E^{14}$ upon the platform to hold the friction pulleys carried by the plates $E^7$ in different positions relative to the friction wheels E' and $E^2$, accordingly as it may be desired to drive the truck forward, backward or so positioning the intervening wheels as to be free from contact with the friction wheel E'.

A conveyer frame F is fastened to the main truck frame by means of pivotal pins F' passing through registering apertures in the conveyer and truck frames which has a bottom $F^x$. Said conveyer frame carries the endless conveyer G passing over the sprocket wheels G' upon the shafts $G^2$ and the lower end of the truck frame carries a shovel or scoop $G^4$ upon which the material to be loaded is conveyed. Rising from the opposite sides of the frame F are the standards H, and H' designates a worm shaft journaled in the frame F and has one end squared for the reception of a crank. A rod $H^2$ is journaled upon the standard and has worm gear connections with the shaft H', while the same rod H² has threaded connections with a pivoted nut H³ which is journaled upon the swinging rake frame I, the rear ends of which are pivotally mounted upon a shaft I' supported in the standards I². Shafts K and K' are journaled in the frame I near the forward end thereof, and a pulley K² is fixed to the shaft K about which and a pulley I³ upon the shaft I' a suitable belting I⁴ passes. A pulley Iˣ is also fixed to the shaft I' and a belt Iʸ passes about said pulley Iˣ and a pulley Eˣ which is fixed to the shaft E, forming means for driving the shaft I'. The shaft K' has sprockets K⁴ fixed thereto about which and the sprocket wheels K⁵, which are fixed to the shaft K, sprocket chains K⁶ pass and which have the rakes L fixed thereto, the teeth of which are adapted to engage the material to be loaded and cause the same to be raked upon the shovel at the lower end of the conveyer frame and raise the same to be engaged by the endless conveyer upon the conveyer frame.

Means for raising and lowering the free swinging end of the conveyer frame consists of a worm shaft N journaled in the vertically disposed beams F⁵ of the main truck frame and which has geared connection through the worm gear rods L' with gear worm wheels journaled upon the frame F⁵, said shafts L being adapted to be raised and lowered by means of a crank L².

The upper end of the conveyer frame is provided with an exit opening M, about which is a hopper M⁵, through which the material, raised by the conveyers, is adapted to fall upon the endless conveyer O which is mounted in the conveyer frame O'. A shaft O² is journaled in said frame O' and to which is keyed a sprocket wheel O³ having chain connection with the sprocket wheel O⁴ which is fixed to the shaft O⁵, journaled in the arms P of the yoke P'. The yoke P' has swivel connection through the medium of the vertically disposed shaft P² with an aperture in the plate P³ mounted upon crosspieces P⁴ connecting the strips P⁵ which are fastened underneath the conveyer frame, being held by the bars P⁶ and standards I². Fixed to the upper end of the shaft P² is a beveled gear J which is in mesh with a beveled gear J' fixed to the shaft O⁵, while at the lower end of the shaft P² is a beveled gear J² which is in mesh with a beveled gear J³ fixed to the shaft J⁴, journaled in the bars P⁵. A pulley Mˣ is fastened to the shaft J⁴ and has belted connections M' with a pulley M² which is fixed to the shaft I', while a second pulley M³ is also fastened to the shaft I' and has belted connections M⁴ with a pulley M⁶ fixed to the shaft G² of the main conveyer, thereby forming gear connections whereby the conveyer O may be driven. The bottom of the auxiliary conveyer frame is extended at its upper end forming an end piece O¹⁰ to guide the material as it falls through the hopper above and upon the conveyer O. The free end of the frame O' is raised and lowered by means of a rope O⁶ which is fastened to the eye O⁷ at the upper end of the conveyer frame.

The operation of my invention will be readily understood and is as follows: When it is desired to load any commodity, the apparatus is moved so that the shovel part will be positioned adjacent to the material to be loaded. The frame I may be raised and lowered in order to bring the rakes over the material which is desired to be moved by the tines of the rakes upon the shovel or scoop part of the conveyer frame. Motion is imparted to the apparatus through the geared connections shown, causing the rake teeth to elevate the material until it reaches the conveyer proper and up which it is raised and deposited through the exit opening where it falls upon the conveyer O which is driven by the belted connections shown. The conveyer frame O' carrying the conveyer O may be of suitable length in order to deposit the material at different locations where desired. By raising and lowering the frame O', the material may be deposited at different elevations.

Through the adjusting means shown, it will be noted that the conveyer frame may be held at different inclinations and also the swinging frame I mounted thereon, adapting the same to varying conditions. By the provision of the friction pulley means, the truck may be run forward or backward as may be desired and the conveyer frame may be entirely detached from the truck, if desired, if it is wished to utilize the latter for other purposes.

What I claim to be new is:—

1. A loading apparatus comprising a truck, a conveyer frame and endless conveyer therein, said frame having beams projecting from the lower end thereof and at an angle to the conveyer and pivoted to said truck, adjusting screws mounted on the truck, gear mechanism for rotating the screws, nuts mounted upon the conveyer frame and having threaded openings for engagement with said screws, standards projecting from the beams upon said conveyer frame, a second conveyer frame pivoted to one of said standards, a conveyer supported by said second-referred-to frame, and means carried by said beam for adjusting the latter, as set forth.

2. A loading apparatus comprising a truck, a conveyer frame and endless conveyer therein, said frame having beams projecting from the lower end thereof and at an angle to the conveyer and pivoted to said truck, adjusting screws mounted on the truck, gear mechanism for rotating the screws, nuts mounted upon the conveyer frame and having threaded openings for engagement with said screws, standards projecting from the beams upon said conveyer frame, a second conveyer frame pivoted to one of said standards, a conveyer supported by said second-referred-to frame, means carried by said beam for adjusting the latter, strips fastened to the first referred to conveyer frame, and an endless conveyer frame and conveyer therein mounted upon said strips, as set forth.

In testimony whereof I have hereunto affixed my signature in presence of two witnesses.

JOHN L. SCHNEIDER.

Witnesses:
R. V. McCAMMOND,
WARD E. KEPPLE.